United States Patent
Kanwetz et al.

(10) Patent No.: US 9,245,409 B1
(45) Date of Patent: Jan. 26, 2016

(54) SYSTEM AND METHOD FOR COMMUNICATING A GAMING MACHINE NOTIFICATION TO A MOBILE DEVICE

(71) Applicant: Joingo, LLC, San Jose, CA (US)

(72) Inventors: Alex Kanwetz, Incline Village, NV (US); John D. Finney, Incline Village, NV (US)

(73) Assignee: Joingo, LLC., San Jose, CA (US)

( * ) Notice: Subject to any disclaimer, the term of this patent is extended or adjusted under 35 U.S.C. 154(b) by 0 days.

(21) Appl. No.: 14/720,750

(22) Filed: May 23, 2015

Related U.S. Application Data (60) Provisional application No. 62/059,877, filed on Oct. 4, 2014.

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *G07F 17/32* | (2006.01) |

(52) U.S. Cl.
CPC .......... *G07F 17/323* (2013.01); *G07F 17/3225* (2013.01); *G07F 17/3293* (2013.01)

(58) Field of Classification Search
USPC .................... 463/20, 22, 25, 39, 42
See application file for complete search history.

(56) References Cited

U.S. PATENT DOCUMENTS

| | | | |
|---|---|---|---|
| 6,302,793 B1 | 10/2001 | Fertitta, III et al. | |
| 6,672,589 B1 | 1/2004 | Lemke et al. | |
| 7,018,291 B1 | 3/2006 | Lemke et al. | |
| 7,682,245 B2 | 3/2010 | Nguyen | |
| 7,690,995 B2 | 4/2010 | Frankulin et al. | |
| 7,699,703 B2 | 4/2010 | Muir et al. | |
| 7,731,586 B2 | 6/2010 | Letovsky et al. | |
| 8,160,625 B1 | 4/2012 | Boyle et al. | |
| 8,233,925 B1 | 7/2012 | Boyle et al. | |
| 8,315,209 B1 | 11/2012 | Boyle et al. | |
| 8,433,342 B1 | 4/2013 | Boyle et al. | |
| 8,463,645 B1 | 6/2013 | Boyle | |
| 8,573,499 B1 | 11/2013 | Boyle | |
| 8,581,721 B2 | 11/2013 | Asher et al. | |
| 8,583,777 B1 | 11/2013 | Boyle et al. | |
| 8,606,294 B2 | 12/2013 | Alizadeh-Shabdiz | |
| 8,644,810 B1 | 2/2014 | Boyle et al. | |
| 8,693,403 B1 | 4/2014 | Boyle et al. | |
| 8,725,170 B1 | 5/2014 | Boyle et al. | |
| 8,738,036 B1 | 5/2014 | Boyle et al. | |
| 8,771,063 B1 | 7/2014 | Boyle | |
| 8,843,847 B1 | 9/2014 | Boyle et al. | |
| 8,985,443 B1 | 3/2015 | Boyle | |

(Continued)

FOREIGN PATENT DOCUMENTS

EP          2050544          4/2009

*Primary Examiner* — Adetokunbo O Torimiro
(74) *Attorney, Agent, or Firm* — Clause Eight IPS; Michael Catania (57) ABSTRACT

A system and method for communicating gaming machine information to a player is disclosed herein. The system includes a mobile communication device for the player, a server and a gaming machine at a venue. The gaming machine comprises a transceiver for receiving and transmitting short-range communication transmissions, and a maximum payoff event. The communication informs the player that the maximum payoff event for the gaming machine has not occurred and invites the player to visit the venue during the interval between visits.

14 Claims, 9 Drawing Sheets

(56) References Cited

U.S. PATENT DOCUMENTS

| | | |
|---|---|---|
| 2007/0061041 A1 | 3/2007 | Zweig |
| 2007/0126635 A1 | 6/2007 | Houri |
| 2008/0280624 A1 | 11/2008 | Wrappe |
| 2010/0016069 A1* | 1/2010 | Herrmann .................... 463/25 |
| 2010/0075661 A1 | 3/2010 | Li |
| 2010/0287288 A1 | 11/2010 | Driscoll et al. |
| 2011/0029359 A1 | 2/2011 | Roeding et al. |
| 2012/0176491 A1 | 7/2012 | Garin et al. |
| 2013/0115969 A1 | 5/2013 | Holmes et al. |
| 2013/0231180 A1 | 9/2013 | Kelly et al. |
| 2013/0344941 A1 | 12/2013 | Nelson et al. |
| 2014/0018155 A1 | 1/2014 | Nelson et al. |

* cited by examiner

| Player # 770 | | | | |
|---|---|---|---|---|
| Game | Machine# | Date | Time | W/L |
| Slots | 18 | 08/01/2014 | 12:00 PM | $225 |
| Slots | 18 | 08/01/2014 | 5:45 PM | $350 |
| Slots | 18 | 08/03/2014 | 11:00 AM | $150 |
| Slots | 18 | 08/08/2014 | 12:00 PM | $150 |
| Slots | 18 | 08/08/2014 | 5:45 PM | $650 |
| Slots | 18 | 08/10/2014 | 11:00 AM | $450 |
| Slots | 18 | 08/15/2014 | 12:00 PM | $200 |
| Slots | 18 | 08/15/2014 | 5:45 PM | $450 |

SYSTEM AND METHOD FOR COMMUNICATING A GAMING MACHINE NOTIFICATION TO A MOBILE DEVICE

CROSS REFERENCES TO RELATED APPLICATIONS

The Present Application claims priority to U.S. Provisional Patent Application No. 62/059,877, filed on Oct. 4, 2014, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to wireless communications. More specifically, the present invention relates to a method and system for communicating a gaming machine notification to a mobile device of a player.

2. Description of the Related Art

Gamblers often have a favorite gaming machine that the gambler plays at a particular casino. The gambler is often trying to win the big pay-off for the gaming machine, and the gambler is often concerned that another gambler will win the pay-off when the gambler is not at the casino playing the gaming machine.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

BLUETOOTH LOW ENERGY (aka "BLE" or "BLUETOOTH LE") is a communication format from the Bluetooth Special Interest Group which uses the 2.4 gigaHertz band of BLUETOOTH technology but with a simpler modulation system that supports data pockets ranging from 8 to 27 octets, which are transferred at 1 Mbps.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

DHCP (Dynamic Host Configuration Protocol) is a standard network protocol defined by RFC 1541 that allows a server to dynamically distribute IP addressing and configuration information, such as the subnet mask and the default gateway, to clients upon client requests.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Wayfinding is defined as tracking an object within a predetermined space.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

The prior art has failed to disclose a system that communicates a pay-off status to a gambler.

BRIEF SUMMARY OF THE INVENTION

The present invention provides a solution to communicating a pay-off to a gambler.

One aspect of the present invention is a method for communicating gaming machine information to a player. The method comprises associating a gaming machine at a venue with a player who has played the gaming machine in excess of a predetermined threshold of times and whom is a member of a loyalty program of the venue. The method then determines a venue visit pattern, including venue visit time and an interval between visits, for the player. The method also determines that a maximum payoff event for the gaming machine has not occurred during the interval between visits. Lastly, the method transmits a communication to the player that the maximum payoff event for the gaming machine has not occurred. The communication further invites the player to visit the venue during the interval between visits.

The gaming machine is preferably one of a slot machine, video poker machine, video blackjack machine or pai gow machine.

The communication transmitted to the player preferably comprises transmitting a SMS text to the player's mobile communication device.

Alternatively, the communication transmitted to the player comprises transmitting an email to the player.

Alternatively, the communication transmitted to the player comprises transmitting an alert to a native application on the player's mobile communication device.

When associating a gaming machine at a venue with a player, a plurality of activations for a loyalty card of the player at the gaming machine is recorded.

Preferably, associating a gaming machine at a venue with a player comprises receiving and transmitting near field communications between a native application on the player's mobile communication device and the gaming machine.

Another aspect of the present invention is a system communicating gaming machine information to a player. The system includes a mobile communication device for a player. The mobile communication device comprises a resident mobile application for a venue that is configured to transmit a communication utilizing a short range communication format. The system also includes a gaming machine at the venue. The gaming machine comprises a transceiver for receiving and transmitting short range communication transmissions, and a maximum payoff event. The system further includes a server in communication with the gaming machine over a WLAN. The server associates the gaming machine at the venue with a player who is a member of a loyalty program of the venue and the player has played the gaming machine in excess of a predetermined threshold of times. Additionally, the server determines a venue visit pattern for the player, which comprises venue visit time and an interval between visits. The server also determines that the maximum payoff event for the gaming machine has not occurred during the interval between visits. The server further transmits a communication to the player. The communication informs the player that the maximum payoff event for the gaming machine has not occurred and invites the player to visit the venue during the interval between visits.

The server preferably transmits a SMS text to the player's mobile communication device.

Alternatively, the server transmits an email to the player.

Alternatively, the server transmits an alert to a native application on the player's mobile communication device.

Preferably, the server records a plurality of activations for the player's loyalty card at the gaming machine.

Also, the server records near field communications between a native application on the player's mobile communication device and the gaming machine.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
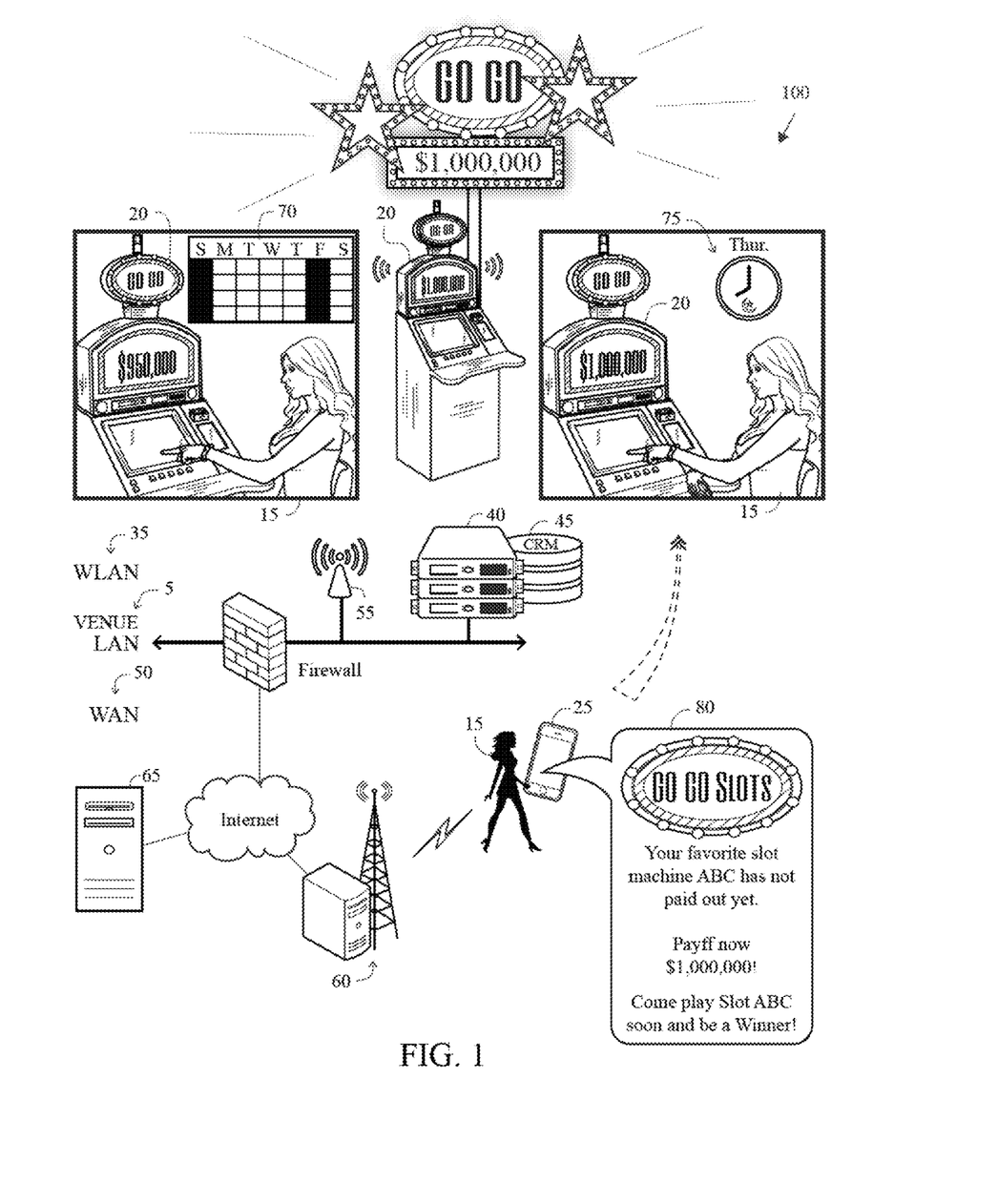
FIG. 1 is a block diagram of a system for communicating gaming machine information to a player.

As shown in FIG. 1, a system for communicating gaming machine information to a mobile communication device player is generally designated 100. The system 100 preferably comprises a gaming machine 20 at a venue 5, a mobile communication device 25 for a player 15, and a server 40. The gaming machine 20 preferably comprises a transceiver for receiving and transmitting short-range communication transmissions. The gaming machine 20 also comprises a maximum payoff event. The mobile communication device 25 preferably comprises a resident mobile application for the venue 5. The mobile resident application is configured to transmit a communication utilizing a short-range communication format. The server 40 preferably is in communication with the gaming machine 20 over a WLAN 35 of the venue 5 via a wireless AP 55. The server 40 associates the gaming machine 20 with a player 15 and determines a venue visit pattern 70 for the player 15. The venue visit pattern comprises venue visit time and an interval between visits. The server 40 also determines if a maximum payoff event for the gaming machine 20 has occurred or not during the time interval between the player's visits. If the maximum payoff event for the gaming machine 20 has not occurred then the server transmits a communication 80 to the player 15 and invites the player 15 to visit the venue during an interval 75 between visits. Alternatively, a message server 65 located off-site, at a site owned by the venue or maintained by a third party, receives information from the venue server 40 via the WAN 50 to transmit a communication message 80 to the player 15. Communication to the player's mobile device 25 is generally through the cellular network 60.

The venue is preferably any type of organization that desires to reward customers, engage customers, conduct a mobile marketing campaign or similar mobile marketing program to customers. The venue is preferably a casino, resort or leisure facility. Alternatively, the venue is preferably one of an airport, a hospital, a convention center, a university, a school, an amusement park, or a municipality. However those skilled in the pertinent art will recognize that the venue may be another area, building or the like without departing from the scope and spirit of the present invention. Those skilled in the pertinent art will recognize other types of enterprises that can use the present invention.

The venue gaming machine 20 is preferably one of a slot machine, video poker machine, video blackjack machine or pai gow machine.

The server 40 preferably records the activations of a player's loyalty card at the gaming machine 20. The server 40 alternatively records near field communications between a native application on the player's mobile communication device and the gaming machine 20.

The CRM database 45 preferably contains multiple files of members of the rewards program. Each file preferably contains data on a member, and the data is information provided by the member, information collected at the venue and information collected from third party sources. Information for the end-user (e.g., patron of the rewards program of the venue) preferably includes a preferred language, gender, residence, citizenship, net worth, food and drink preferences, gambling habits, value to the venue, email address, mobile device identifier, and name (if not an anonymous rewards program). The value to the venue includes the spending habits of the end-user, entertainment habits, stays at the venue, duration of stays, losses or wins if the venue is a casino, associates, and like information. The CRM database 45 is preferably located on site at the venue. Alternatively, the CRM database 45 is located off-site at a site owned by the venue or maintained by a third party.

Figure 2:
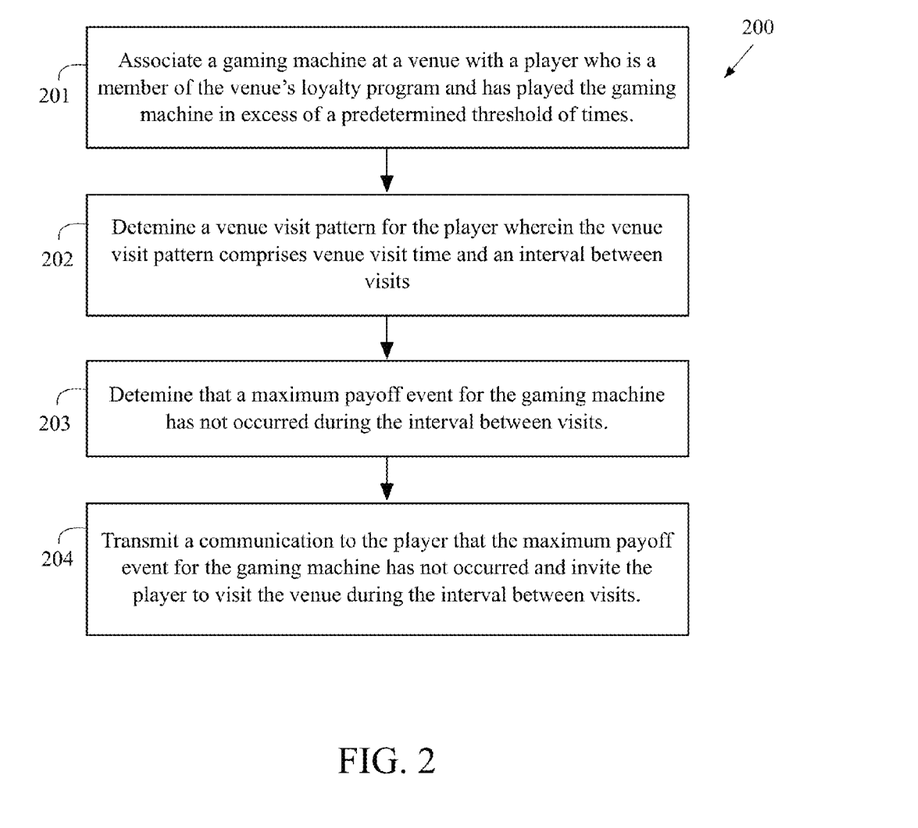
FIG. 2 is a flow chart of a method for communicating gaming machine information to a player.

A flow chart for a method 200 for communicating gaming machine information to a player is shown in FIG. 2. At block 201, a gaming machine at a venue is associated with a player who has played the gaming machine in excess of a predetermined threshold of times. The predetermined threshold of times is preferably as often as every visit to the casino by the player in the last twelve months, every other visit by the player, or a visit each month for the last twelve months. Alternatively, the predetermined threshold of times is a percentage of the time a player is at the casino during any visit such as a player spending ninety percent of the player's time at the one gaming machine during each visit. The player is a member of the venue's loyalty program. A venue visit pattern for the player is then determined at block 202. The venue visit pattern preferably includes venue visit time and an interval between visits. A player may visit a casino, monthly, weekly and even daily. Determining that a maximum payoff event for the gaming machine has not occurred during the interval between visits is shown at block 203. Transmitting a communication to the player that the maximum payoff event for the gaming machine has not occurred is shown at block 204. The communication also includes inviting the player to visit the venue during the interval between visits.

Figure 3:
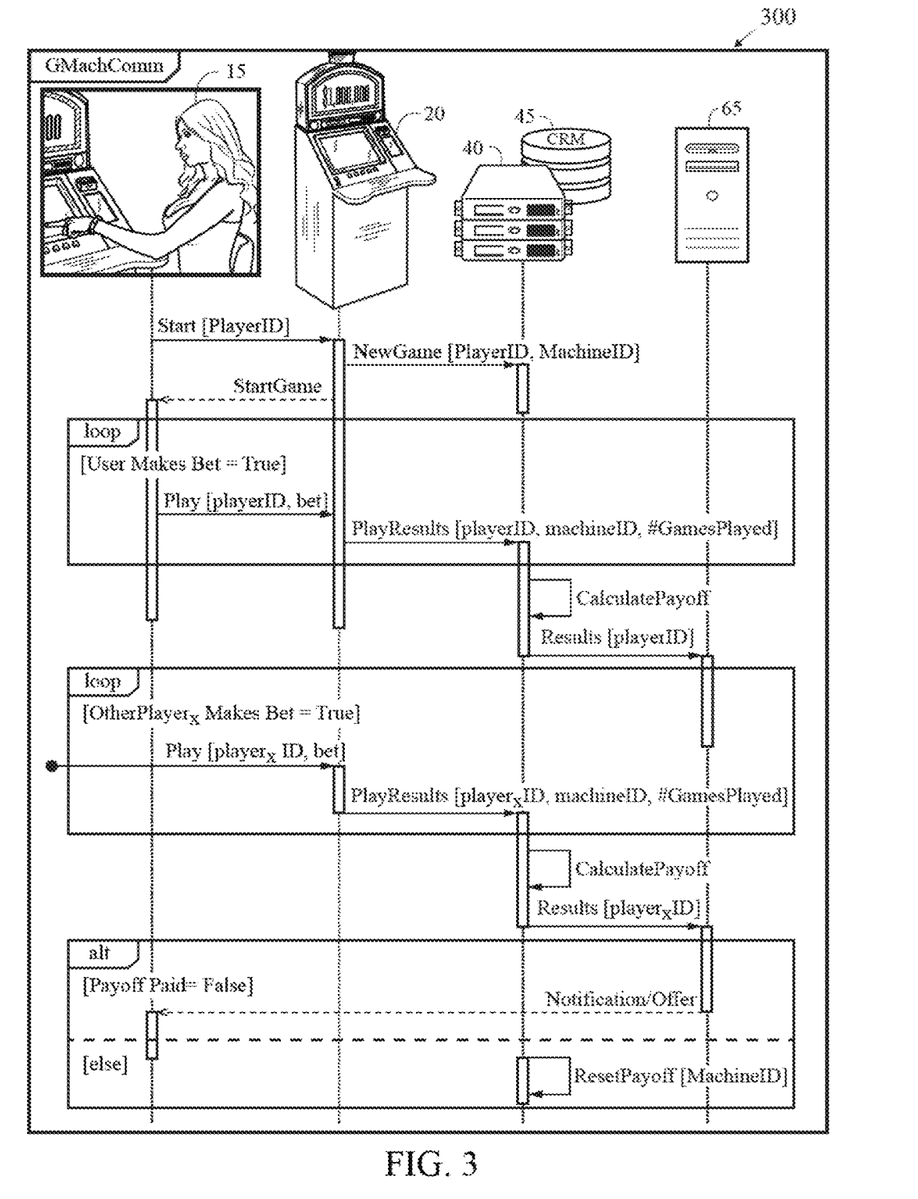
FIG. 3 is a sequence diagram of communication between a gaming machine and servers.

A communications sequence diagram 300 for communications between a player 15, a gaming machine 20, a venue server 40 and CRM database 45, and message server 65 is shown in FIG. 3. The player 15 starts gaming at the gaming machine 20 using their loyalty rewards identification. The gaming machine 20 sends data to the venue server 40/database 45 including information such as player ID and machine ID or other unique ID. The gaming machine is associated with the player and the game is started. The loop shows that as long as the player keeps making bets, the game continues and information of game play is sent from the gaming machine 20 to the server 40/database 45. When the player ends placing bets, in effect, ending the game, the server 40 calculates whether or not the payoff has been paid during the period of game play.

Another loop shows another player, $player_x$, playing on the game machine, and as long as $player_x$ keeps making bets, the game continues and information of game play is sent from the gaming machine 20 to the server 40/database 45. When $player_x$ ends placing bets, in effect, ending the game, the server 40 calculates whether or not the payoff has been paid during the period of game play of $player_x$. In the alternative interaction, if the gaming machine 20 has not paid a payoff, then a communication, such as a notification or an offer, is sent by the message server 65 to the player 15. Otherwise, if the gaming machine 20 has paid a payoff, the payoff is reset.

Preferably, the venue server 40 associates the gaming machine 20 with a player 15 by recording activations of the player's loyalty card at the gaming machine 20. Preferably, there is a predetermined threshold of times of which a player must have played in excess to be associated with the gaming machine 20.

Alternatively, the venue server 40 associates the gaming machine 20 with a player 15 by recording near field communications received and transmitted between a native application on a mobile communication device 25 of the player 15 and the gaming machine 20, such as disclosed in Boyle et al., U.S. patent application Ser. No. 14/337,296, filed on Jul. 22, 2014, for a System And Method For Associating A Mobile Device With A Patron, which is hereby incorporated by reference in its entirety.

The mobile communication devices 25 utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., GALAXY S® smartphones from Samsung Electronics Co., Ltd, and many more. Examples of tablet computing devices include the IPAD® tablet from Apple Inc., and the GALAXY TAB® tablet from Samsung Electronics Co., Ltd.

Figure 4:
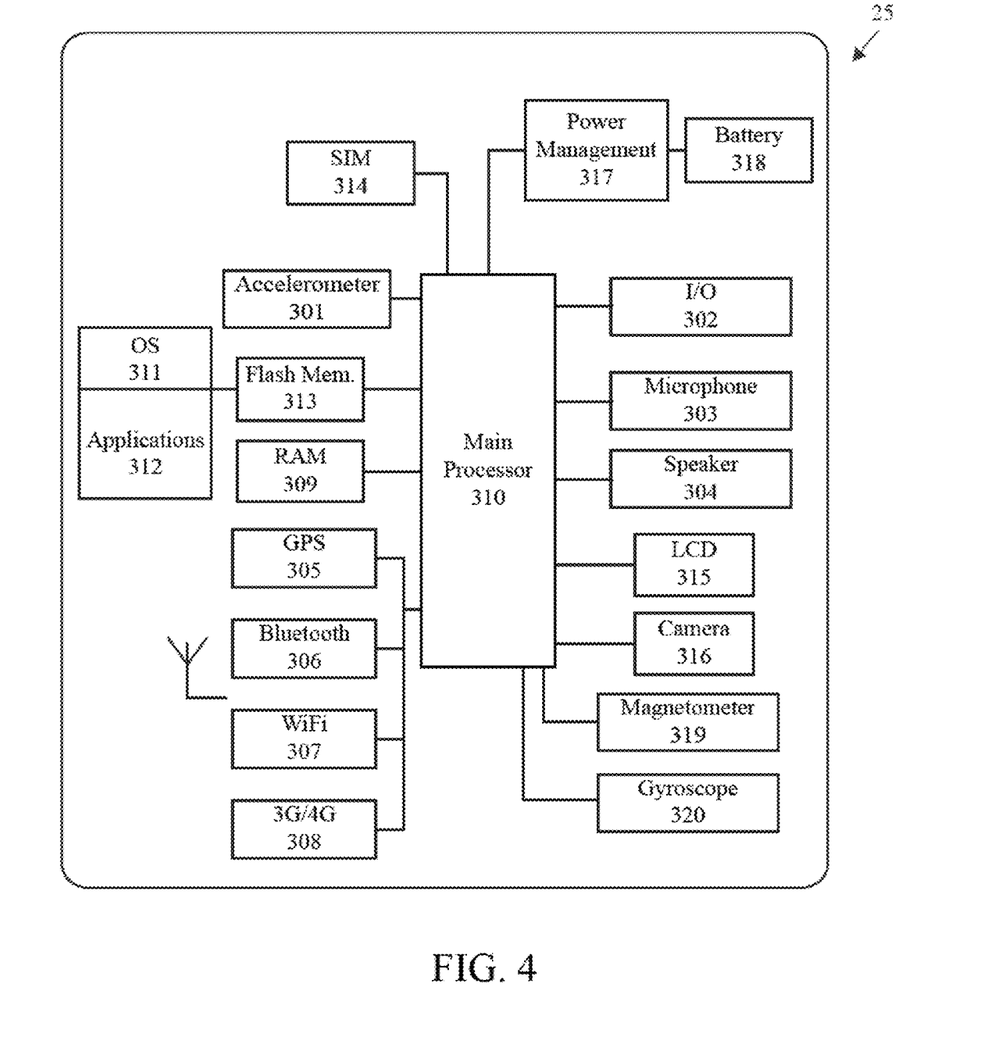
FIG. 4 is an isolated view of general electrical components of a mobile communication device.

As shown in FIG. 4, a typical mobile communication device 25 includes an accelerometer 301, I/O (input/output) 302, a microphone 303, a speaker 304, a GPS chipset 305, a Bluetooth component 306, a Wi-Fi component 307, a 3G/4G component 308, RAM memory 309, a main processor 310, an OS (operating system) 311, applications/software 312, a Flash memory 313, SIM card 314, LCD display 315, a camera 316, a power management circuit 317, a battery 318 or power source, a magnetometer 319, and a gyroscope 320.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

The network is preferably the WLAN 35 of the venue 5, as shown in FIG. 1, and a communication message 80 from the venue server 40 is sent over the WLAN 35, and the Internet, WAN 50, if necessary, to the player's mobile device 25. Alternatively, the network is a communications network 60 of a wireless telecommunications carrier and the communication message 80 is sent over the communications network 60, over the Internet, and to the player's 15 mobile device 25.

A mobile communication service provider (aka phone carrier) of the customer such as VERIZON, AT&T, SPRINT, T-MOBILE, and the like mobile communication service providers, provide the communication network 60 for communication to the mobile communication device of the end user.

Wireless standards include 802.11a, 802.11b, 802.11g, AX.25, 3G, CDPD, CDMA, GSM, GPRS, radio, microwave, laser, Bluetooth, 802.15, 802.16, and IrDA.

Figure 5:
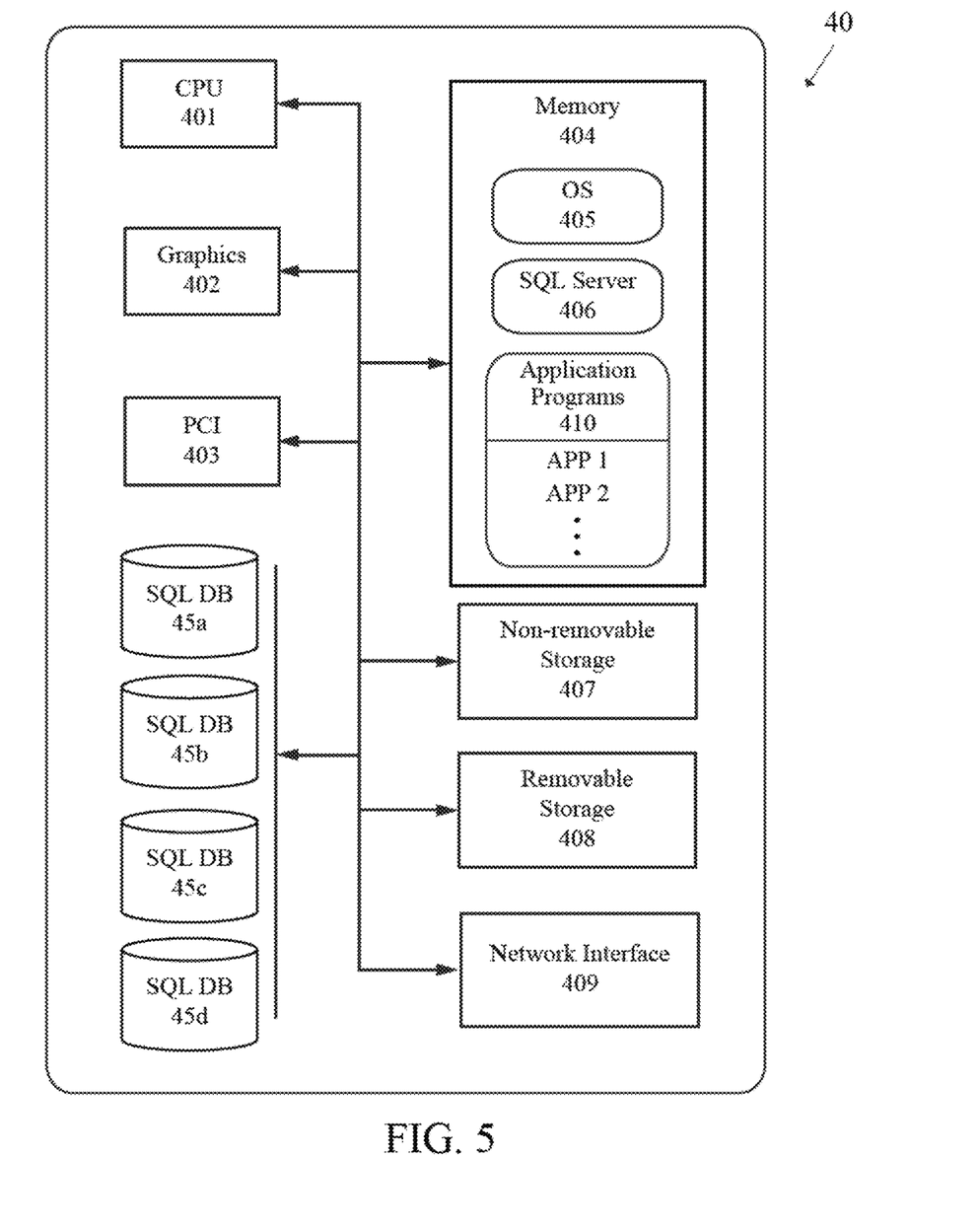
FIG. 5 is an isolated view of general electrical components of a server.

Components of a venue server 40 of the system 100, as shown in FIG. 5, includes a CPU component 401, a graphics component 402, PCI/PCI Express 403, memory 404, non-removable storage 407, removable storage 408, Network Interface 409, including one or more connections to a fixed network, and SQL database(s) 45a-45d, which includes the venue's CRM. Included in the memory 404, is an operating system 405, a SQL server 406 or other database engine, and computer programs/software 410. The venue server 40 also includes at least one computer program configured to receive data uploads and store the data uploads in the SQL database. Alternatively, the SQL server can be installed in a separate server from the venue server 40.

The communication message 80 sent to the mobile device 25 is preferably a text message sent by the server 40. Alternatively, the gaming machine 20 or a message server 65 can be configured to send a message 80 to the mobile device 25.

Preferably, the communication message 80 is an SMS text to the player's mobile communication device 25. The text message notifies the player that their gaming machine has not yet paid out the payoff or jackpot. Preferably, the message includes the payoff amount and invites the player to come back to play the gaming machine, enticing the player with the higher possibility of winning the payout.

Alternatively, the communication message 80 is an email transmitted to the player. Alternatively, an alert is pushed to a native application on the player's mobile communication device 25. The communication message 80 can include a simple notification that a payout has not occurred or an offer to entice the player back to the venue to play more often than usual, during an interval between the player's regular visits. The communication message 80, can be based on the accessible profile information for the player 15, in the CRM database 45 of the venue, and the payout information of the gaming machine 20.

Figure 6:
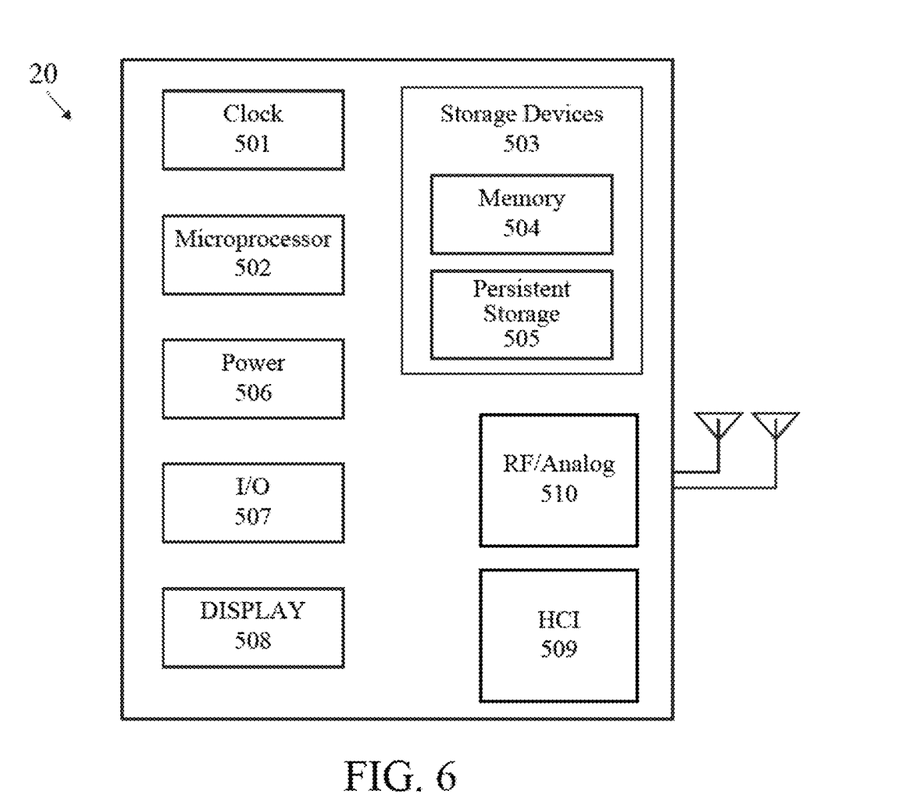
FIG. 6 is an isolated view of general electrical components of a gaming machine.

As shown in FIG. 6, a typical gaming machine 20 includes a clock 501, a microprocessor 502, power 506, I/O interfaces 507, display 508, storage devices 503 such as memory 504 and persistent storage 505, RF/Analog circuit and antenna 510 and HCI (Host Controller Interface) 509.

Figure 7:
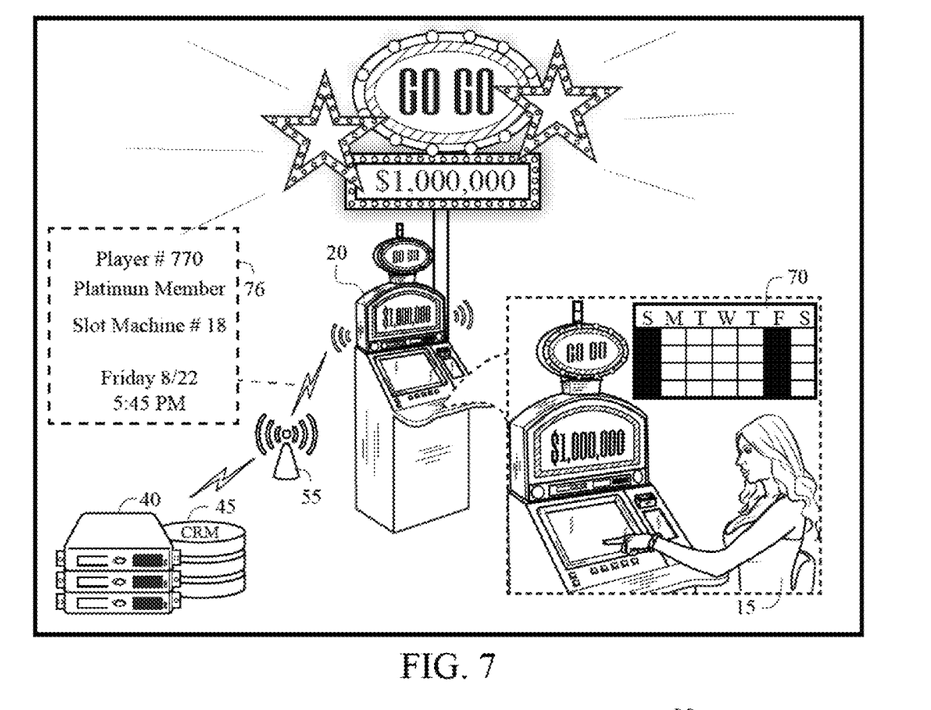
FIG. 7 is a block diagram of front-end communications of a system for communicating gaming machine information to a player.
Figure 7A:
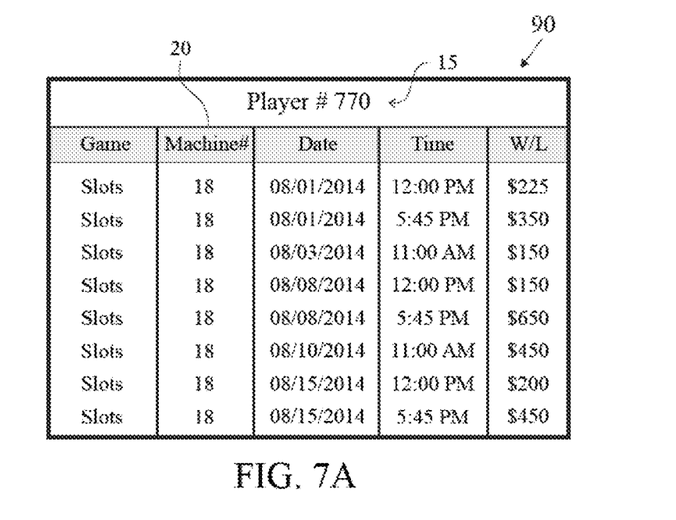
FIG. 7A is an isolated view of a table within the CRM of the venue within a system for communicating gaming machine information to a player.

FIGS. 7-7A shows the components of a visit pattern of a player. A player 15 visits at regular intervals 70, such as every Friday and Sunday. Time of hour can also be established. The gaming machine 20 is associated with the player 15 by the information provided during the interaction with the player 15, such as loyalty card information (player number and member status), the machine ID, and time and date of game. The data is transmitted to the venue server 40/CRM 45, preferably, by a wireless AP 55. The table 90 within the CRM 45 records data for each player 15. A visit pattern and the interval between visits is determined from the recorded data for the player 15. The profile data for the player 15 preferably includes the game type, the game machine 20 associated with the player 15, date, time, and amount won or lost.

Figure 8A:
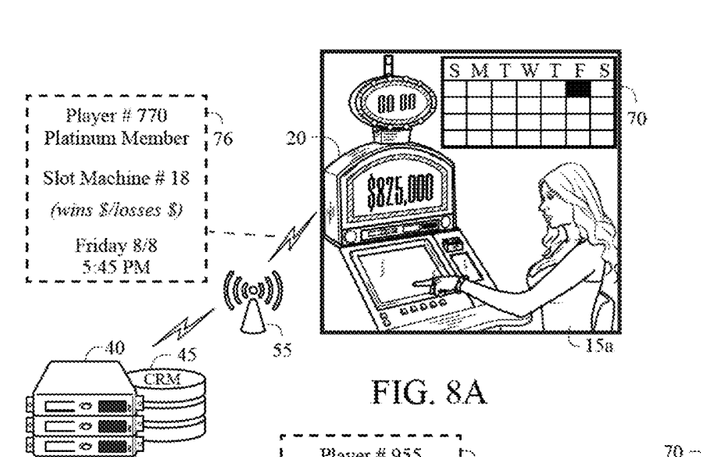
FIG. 8A is an illustration of a schedule and communication within a system of a play on the gaming machine by a player.
Figure 8B:
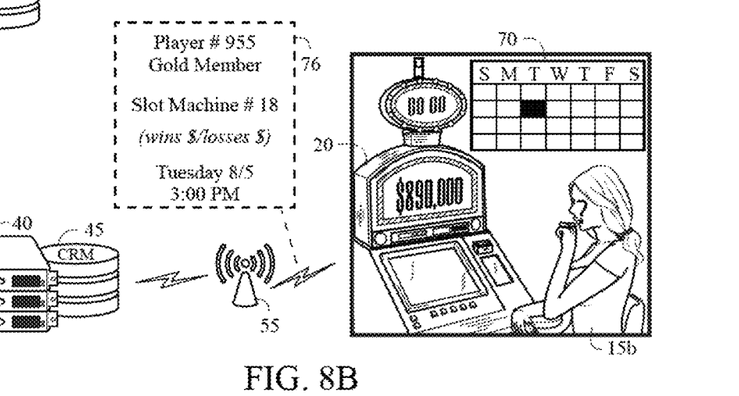
FIG. 8B is an illustration of a schedule and communication within a system of a play on the gaming machine by other players during the interval between visits.
Figure 8C:
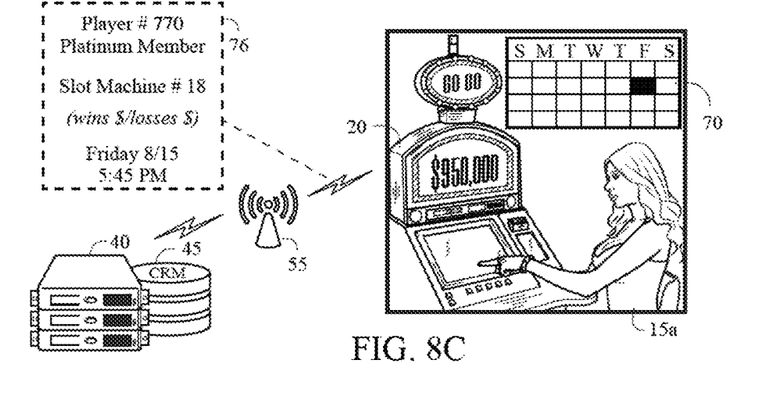
FIG. 8C is an illustration of a schedule and communication within a system of another play on the gaming machine by a player.
Figure 8D:
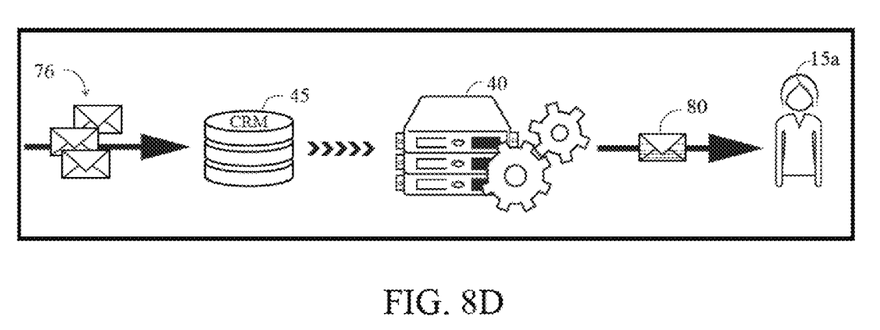
FIG. 8D is a block diagram of the communications between the gaming machine and the player's mobile communication device.
Figure 8E:
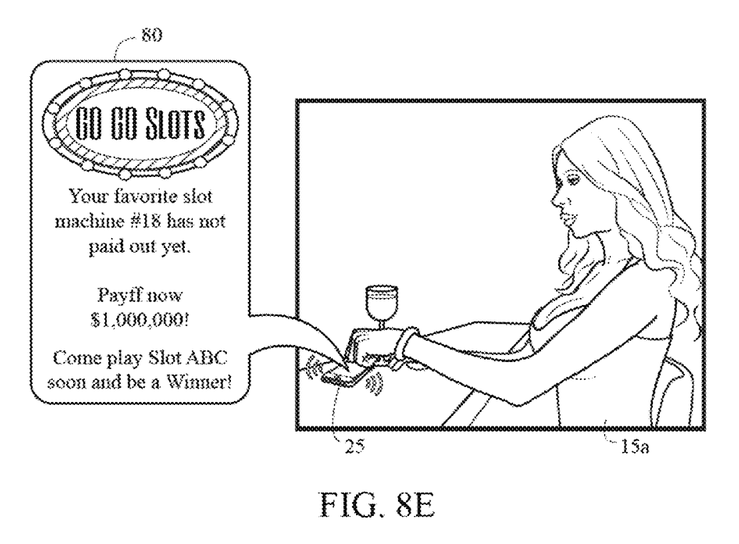
FIG. 8E is an illustration of a player receiving an SMS text from the server of the present invention.

FIGS. 8A-8E illustrate the steps for communicating gaming machine information to a player. FIGS. 8A and 8C, show a primary player 15a playing a gaming machine 20, Machine #18, each Friday of a month, establishing a regular schedule 70. FIG. 8B shows another player 15b playing on Machine #18 during an interval day of the primary player's 15a schedule 70, as illustrated by the schedule 70 and the payout amount rising on the display. As each play is conducted, data packets 76 are sent to the server 40/database 45. FIG. 8D shows the flow of action from the back-end. The data packets 76 are sent to be recorded in the CRM database 45. The server 40 processes/analyzes the gaming information, determines that the payout has not been paid, and sends an SMS message 80 to the primary player 15a.

The present invention may be utilized with a marketing system such as disclosed in Boyle et al., U.S. Pat. No. 8,433, 342, for a Method And System For Personalized Venue Marketing, which is hereby incorporated by reference its entirety. The present invention may be utilized with a gaming system such as disclosed in Boyle, U.S. Pat. No. 8,771,063, for a System And Method For Managing Games In A Mobile Virtual Casino, which is hereby incorporated by reference its entirety. The present invention may be utilized with a gaming system such as disclosed in Boyle, U.S. patent application Ser. No. 13/756,591, filed on Jan. 31, 2013, for a System And Method For Virtual Currency In A Virtual Casino, which is hereby incorporated by reference its entirety. The present invention may be utilized with a gaming system such as disclosed in Boyle, U.S. Pat. No. 8,944,910, for a System And Method For Secure Play In A Mobile Virtual Casino, which is hereby incorporated by reference its entirety. The method and system of the present invention may be utilized with an anonymous loyalty program such as described in Boyle, U.S. Pat. No. 8,463,645, for an Anonymous Rewards Club Program, which is hereby incorporated by reference in its entirety. The method and system of the present invention may be utilized with the system described in Boyle et al., U.S. Pat. No. 8,693,403, for a Method And System For Detection And Correction of Wi-Fi Login Failure, which is hereby incorporated by reference in its entirety. The method and system of the present invention may be utilized with the system described in Greer et al., U.S. Pat. No. 8,959,656, for a Segmented Architecture Method And System, which is hereby incorporated by reference in its entirety. The method and system of the present invention may be utilized with the system described in Boyle, U.S. patent application Ser. No. 13/844,585 filed on Mar. 15, 2013, for a Method And System For Freemium WiFi Service, which is hereby incorporated by reference in its entirety. The method and system of the present invention may be utilized with the system described in Boyle, U.S. patent application Ser. No. 13/843,627 filed on Mar. 15, 2013, for a Method And System For Incentivizing On-Site Participation In Games And Offers which is hereby incorporated by reference in its entirety. The method and system of the present invention may be utilized with the system described in Boyle, U.S. patent application Ser. No. 13/974,040 filed on Aug. 22, 2013, for a Method And System For Including Content In A WiFi Stream, which is hereby incorporated by reference in its entirety. The method and system of the present invention may be utilized with the system described in Boyle, U.S. Pat. No. 8,583,777, for a Method And System For Providing Real-Time End-User WiFi Quality Data, which is hereby incorporated by reference in its entirety. The method and system of the present invention may be utilized with the system described in Boyle, U.S. Pat. No. 8,725,170, for a Method And System For Measuring The Quantity, Type And Transmission Quality Mobile Communication Devices Within A Defined Geographical Area, which is hereby incorporated by reference in its entirety. The method and system of the present invention may be utilized with the system described in Boyle, U.S. Pat. No. 8,738,036, for a Method And System For Wayfinding, which is hereby incorporated by reference in its entirety. The method and system of the present invention may be utilized with the system described in Boyle, U.S. Pat. No. 8,573,499, for a Quick Response Code Business Card, which is hereby incorporated by reference in its entirety From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for communicating gaming machine information to a player, the method comprising:
   associating a gaming machine at a venue with a player, wherein the player is a member of a loyalty program of the venue and the player has played the gaming machine in excess of a predetermined threshold of times;
   determining a venue visit pattern for the player wherein the venue visit pattern comprises venue visit time and an interval between visits;
   determining that a maximum payoff event for the gaming machine has not occurred during the interval between visits;
   transmitting a communication to the player that the maximum payoff event for the gaming machine has not occurred and inviting the player to visit the venue during the interval between visits.

2. The method according to claim 1 wherein the gaming machine is one of a slot machine, video poker machine, video blackjack machine or pai gow machine.

3. The method according to claim 1 wherein transmitting a communication to the player comprises transmitting a SMS text to a mobile communication device of the player.

4. The method according to claim 1 wherein transmitting a communication to the player comprises transmitting an email to the player.

5. The method according to claim 1 wherein transmitting a communication to the player comprises transmitting an alert to a native application on a mobile communication device of the player.

6. The method according to claim 1 wherein associating a gaming machine at a venue with a player comprises recording a plurality of activations for a loyalty card of the player at the gaming machine.

7. The method according to claim 1 wherein associating a gaming machine at a venue with a player comprises receiving and transmitting near field communications between a native application on a mobile communication device of the player and the gaming machine.

8. A system communicating gaming machine information to a player, the system comprising:
   a mobile communication device for a player, the mobile communication device comprising a resident mobile application for a venue, the mobile resident application configured to transmit a communication utilizing a short range communication format;
   a gaming machine at the venue, the gaming machine comprising a transceiver for receiving and transmitting short range communication transmissions, wherein the gaming machine comprises a maximum payoff event;
   a server in communication with the gaming machine over a WLAN;
   wherein the server associates the gaming machine at the venue with a player, wherein the player is a member of a loyalty program of the venue and the player has played the gaming machine in excess of a predetermined threshold of times;
   wherein the server determines a venue visit pattern for the player wherein the venue visit pattern comprises venue visit time and an interval between visits;
   wherein the server determines that the maximum payoff event for the gaming machine has not occurred during the interval between visits;
   wherein the server transmits a communication to the player that the maximum payoff event for the gaming machine has not occurred and invites the player to visit the venue during the interval between visits.

9. The system according to claim 8 wherein the gaming machine is one of a slot machine, video poker machine, video blackjack machine or pai gow machine.

10. The system according to claim 8 wherein the server transmits a SMS text to a mobile communication device of the player.

11. The system according to claim 8 wherein the server transmits an email to the player.

12. The system according to claim 8 wherein the server transmits an alert to a native application on a mobile communication device of the player.

13. The system according to claim 8 wherein the server records a plurality of activations for a loyalty card of the player at the gaming machine.

14. The system according to claim 8 wherein the server records near field communications between a native application on a mobile communication device of the player and the gaming machine.

* * * * *